(12) United States Patent
Drumm et al.

(10) Patent No.: US 10,330,275 B2
(45) Date of Patent: Jun. 25, 2019

(54) LIGHTING APPARATUS HAVING A LIGHT SOURCE FOR EMITTING ILLUMINATION LIGHT

(71) Applicant: Osram GmbH, Munich (DE)

(72) Inventors: Jan Oliver Drumm, Regensburg (DE); Michael Rosenauer, Regensburg (DE); Benjamin Dollinger, Regensburg (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 16/000,900

(22) Filed: Jun. 6, 2018

(65) Prior Publication Data

US 2018/0356063 A1 Dec. 13, 2018

(30) Foreign Application Priority Data

Jun. 8, 2017 (DE) .................. 10 2017 209 730

(51) Int. Cl.
| | |
|---|---|
| *F21S 41/00* | (2018.01) |
| *F21S 41/32* | (2018.01) |
| *G02B 5/20* | (2006.01) |
| *G02B 5/30* | (2006.01) |
| *G02B 27/09* | (2006.01) |

(Continued)

(52) U.S. Cl.
CPC .............. *F21S 41/32* (2018.01); *F21S 41/16* (2018.01); *F21S 41/176* (2018.01); *F21S 45/70* (2018.01); *G02B 5/20* (2013.01); *G02B 5/30* (2013.01); *G02B 27/0933* (2013.01); *G02B 27/0977* (2013.01)

(58) Field of Classification Search
CPC ............................................... B60Q 1/02–245
See application file for complete search history.

(56) References Cited

U.S. PATENT DOCUMENTS

| | | | | |
|---|---|---|---|---|
| 2003/0218753 A1* | 11/2003 | Reuter | ................. | G01M 11/005 356/445 |
| 2013/0187669 A1* | 7/2013 | Jayapala | ............ | G02B 26/0841 324/679 |

(Continued)

FOREIGN PATENT DOCUMENTS

| | | |
|---|---|---|
| DE | 102014017521 A1 | 6/2016 |
| DE | 202016105624 U1 | 10/2016 |
| EP | 2767751 A1 | 8/2014 |

OTHER PUBLICATIONS

German Search Report based on application No. 10 2017 209 730.2 dated Jan. 24, 2018 (7 pages) (Reference Purpose Only).

*Primary Examiner* — Gerald J Sufleta, II
(74) *Attorney, Agent, or Firm* — Viering, Jentschura & Partner MBB (57) ABSTRACT

A lighting apparatus includes a light source for emitting an illumination light, a micromirror array having a plurality of micromirror actuators, and an illumination optical unit and an optical sensor unit. The illumination light emitted by the light source is guided onto the micromirror actuators and reflected at the latter and, with the reflection integrated over time, an on beam is reflected to a lighting application by the micromirror actuators in a respective on tilt position via the illumination optical unit, and an off beam is reflected next to the illumination optical unit by the micromirror actuators in a respective off tilt position. Part of the illumination light contained in the off beam is guided, at least in part, onto the optical sensor unit.

18 Claims, 2 Drawing Sheets

(51) Int. Cl.
  *F21S 41/16*      (2018.01)
  *F21S 41/176*     (2018.01)
  *F21S 45/70*      (2018.01)

(56) References Cited

U.S. PATENT DOCUMENTS

| | | |
|---|---|---|
| 2015/0160454 A1* | 6/2015 | Bhakta .............. G02B 26/0833 362/513 |
| 2016/0033102 A1  | 2/2016 | Hiratsuka et al. |
| 2017/0003392 A1* | 1/2017 | Bartlett ................. G01S 17/10 |
| 2017/0106793 A1  | 4/2017 | Kumar et al. |
| 2017/0208302 A1* | 7/2017 | Katsumata ........... H04N 9/3158 |
| 2018/0274770 A1* | 9/2018 | Fischer ................. F21S 41/30 |

* cited by examiner

Fig. 4

LIGHTING APPARATUS HAVING A LIGHT SOURCE FOR EMITTING ILLUMINATION LIGHT

CROSS-REFERENCE TO RELATED APPLICATION

This application claims priority to German Patent Application Serial No. 10 2017 209 730.2, which was filed Jun. 8, 2017, and is incorporated herein by reference in its entirety.

TECHNICAL FIELD

Various embodiments relate generally to a lighting apparatus having a light source for emitting illumination light, a micromirror array and an illumination optical unit.

BACKGROUND

A micromirror array is constructed from a multiplicity of micromirrors arranged in a matrix-shaped manner, said micromirrors, as actuators, being switchable and hence tiltable independently of one another. In projection applications, such micromirror arrays are used as image generators. Thus, each micromirror actuator corresponds to a pixel, wherein, depending on the tilt position, light of a certain color (e.g. red, green and blue) incident thereon at respective times is forwarded for imaging purposes to the projection area in an on beam or guided to an absorber (beam dump) in an off beam and "destroyed".

SUMMARY

A lighting apparatus includes a light source for emitting an illumination light, a micromirror array having a plurality of micromirror actuators, and an illumination optical unit and an optical sensor unit. The illumination light emitted by the light source is guided onto the micromirror actuators and reflected at the latter and, with the reflection integrated over time, an on beam is reflected to a lighting application by the micromirror actuators in a respective on tilt position via the illumination optical unit, and an off beam is reflected next to the illumination optical unit by the micromirror actuators in a respective off tilt position. Part of the illumination light contained in the off beam is guided, at least in part, onto the optical sensor unit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

Various embodiments are based on the technical problem of specifying a lighting apparatus.

According to various embodiments, a lighting apparatus has an optical sensor unit, which is arranged in the off beam, i.e. where the micromirror actuators reflect the illumination light in a respective off tilt position. In a respective on tilt position, the illumination light reaches the lighting application via an illumination optical unit; by contrast, the illumination light is guided next to the illumination optical unit in the off beam. The illumination light contained in the off beam is therefore not "destroyed", but instead guided at least in part to the optical sensor unit; said light can then be used for monitoring the light source or the lighting apparatus in general.

Various embodiments are found in the dependent claims and in the entire disclosure, with the presentation not always distinguishing in detail between apparatus and method or use aspects; the disclosure should be read implicitly in any case in respect of all claim categories.

By way of example, monitoring of the light source may be of interest in order to be able to identify and avoid unwanted emergence of radiation with a high beam density in the case of a fault, for instance in the case of a damaged light source. By way of example, the light source can have a pump radiation source and a phosphor element for at least partial conversion of the pump radiation (see below for details), and the pump radiation, which is focused as a rule, could emerge toward the lighting application in the case of a damaged, for instance broken/torn, phosphor element. This may represent a significant photobiological hazard on the lighting application side, possibly having as a consequence damage to the retina and, in the worst case, a loss of sight for an observer. By way of example, in the case of the lighting apparatus according to various embodiments, an evaluation unit that determines an irregularity in the measurement signal of the sensor unit can prompt a control unit of the light source to carry out at least a power reduction or else a complete shutdown.

A field of application of the lighting apparatus lies in the field of motor vehicle lighting, e.g. outside lighting in a front headlamp. On the one hand, particularly stringent safety requirements could emerge herefrom; on the other hand, the light source could also be exposed to a special requirement specification, for instance on account of the temperature variations, mechanical vibrations, etc. In the case of a light source with a phosphor element, the latter may, in certain circumstances, also detach from a mechanical holder or from a carrier in the entirety thereof, for instance on account of a failing joining connection layer. In this case, too, the pump radiation could propagate in focused fashion to the lighting application. Incidentally, however, an unwanted/dangerous radiation propagation also need not necessarily emerge from a defect of the light source itself; instead, the cause may also lie in a defect in one of the optical elements for the beam guidance, for example.

In various embodiments, the micromirror array is used for adaptive street lighting, in which, for example, other road users are selectively excluded from the illumination for the purposes of avoiding dazzle (see below for details). The illumination light emitted by the light source is reflected at the micromirror actuators (also referred to as "actuators"

only below) of the micromirror array (also referred to as "array" only below), i.e. one respective partial beam at each actuator. Depending on the tilt position of the respective actuator, the respective partial beam is supplied to the lighting application via the illumination optical unit (on tilt position) or reflected next to said illumination optical unit and not supplied to the lighting application. Consequently, a light distribution in the far field can be set in a targeted manner by way of the tilt position of the actuators.

The totality of all partial beams that are reflected by the actuators respectively in the on tilt position forms the "on beam"; the totality of all partial beams reflected by the actuators in the respective off tilt position forms the off beam. The on and the off beam each emerge integrated over time because, typically, not all actuators are in the same tilt position at the same time or because the actuators also can be operated in a generally oscillating manner. A time integral can include a time duration in the microsecond range and/or millisecond range and/or second range and/or minutes range and/or longer.

There may also be a further beam (transient beam) between the on and the off beam, said further beam being able to correspond to a non-deflected state of the actuators, a so-called transient flat state, which is not used any further; see also the embodiments for illustrative purposes. On the other hand, on and off beams may however also lie directly next to one another; i.e., expressed differently, it is also possible to actively use the transient flat state.

The "optical sensor unit" has at least one optical sensor that, in general, may also be a CCD or CMOS image sensor; a photodiode as a sensor may be provided (see below). The sensor has a sensitive sensor surface and the radiation incident thereon is converted into a sensor signal. Consequently, conclusions about the radiation power can be drawn, at least qualitatively and preferably quantitatively. In various embodiments, an arrangement is such that the entire illumination light that is guided in the off beam strikes the sensor unit. By way of example, an optical unit may also be provided in the off beam, said optical unit, for example, being able to be configured in a non-imaging manner, e.g. as a light guide, or else in an imaging manner, for instance as a converging lens or corresponding lens system.

The illumination optical unit is assigned to the micromirror array in such a way that the illumination light that is guided through the illumination optical unit by different micromirror actuators in the on tilt position reaches into different spatial directions. Thus, the light distribution in real space in the array plane is converted into a light distribution in angle space of the far field. Selective activation/deactivation of a respective actuator accordingly allows a respective spatial direction or a solid angle range to be selectively supplied with illumination light, or not, as the case may be.

A preceding or oncoming vehicle, captured by a camera system of the motor vehicle for example, can thus be removed from the light cone in a targeted manner by virtue of the respectively assigned actuators being deactivated (brought into a corresponding tilt position), for example. This should illustrate a field of application, but not restrict the concept of various embodiments in its generality.

In general, the illumination optical unit may also have a reflector; a purely refractive illumination optical unit is preferred. In general, a non-imaging illumination optical unit is also conceivable; however, it may be imaging. By way of example, the illumination optical unit can have a lens, e.g. a converging lens, wherein the lens may also be constructed in the style of a lens system from a plurality of single lenses (arranged in succession in relation to the passing illumination). In various embodiments, an arrangement is such that the illumination optical unit images the micromirror array, i.e. the actuators, into infinity.

By way of example, the "micromirror array" (also referred to as digital micromirror device, DMD) can have at least 10, 100, 500, 1000, 5000, 10 000 or 30 000 micromirror actuators and (independently thereof) no more than e.g. $1 \times 10^8$, $1 \times 10^7$ or $1 \times 10^6$ micromirror actuators (in each case with increasing preference along the sequence of specification). The actuators may be part of the same semiconductor component (chip). They are not necessarily switchable completely independently of one another but, for example, may also already be combined in groups on the chip-side. Thus, for example, a plurality of micromirror actuators arranged next to one another can also supply a solid angle range together or not, as the case may be; i.e., all can be activated or deactivated in that case. An already original combination in groups is also possible in respect of certain modes of operation, such as e.g. high beam, low beam, daytime running light, etc.

In various embodiments, the light source has a pump radiation source and a phosphor element e.g. spaced apart therefrom, using which it is possible to realize a very high illuminance. The phosphor element converts at least some of the pump radiation into conversion light; the latter can form the illumination light on its own (complete conversion) or else mixed with portions of pump radiation that has not been converted, with the latter being optionally provided. Even if pump radiation reaches the lighting application in the process, this is uncritical, as a rule, in contrast to the above-described faults because the partly non-converted pump radiation is fanned open, for example on account of scattering processes in the phosphor element. If the phosphor element is damaged, for instance broken, or else completely detached, more and moreover focused pump radiation reaches the lighting application.

A laser source that, for example, also can be constructed from a plurality of individual laser sources may be provided as a pump radiation source. A laser diode may be provided as laser source or as an individual laser source. The phosphor element has a wavelength-converting phosphor, for example cerium-doped yttrium aluminum garnet (YAG:Ce). By way of example, the phosphor can be embodied in particulate form in a matrix material; however, agglomerated phosphor particles or else a single crystal of the phosphor can also form the phosphor element. In general, the illumination light may be white light, which can be achieved, for example, by the yellow-conversion-light-emitting YAG:Ce in the case of a partial conversion with blue pump light.

The pump radiation strikes an incoming radiation surface of the phosphor element and the conversion light is emitted at an emission surface. In general, an operation in reflection is also possible, the incoming radiation surface and the emission surface thus being able to coincide; then, for example, a mirror could be arranged at the opposite side of the phosphor element. The phosphor element may be operated in transmission; that is to say, the incoming radiation surface and the emission surface lie opposite one another. By way of example, a dichroic coating can be provided at the incoming radiation surface, said dichroic coating transmitting the incident pump radiation but reflecting the conversion light subsequently produced in the phosphor element.

In general, the illumination light, e.g. exciting pump radiation, also can be modulated with a certain frequency, at least intermittently. On the one hand, a pulse width modulation (PWM) can serve to set a mean power; on the other hand, a sensor signal that is likewise modulated as a result thereof may also be easier to evaluate, e.g. if a comparatively strong background signal is applied. By way of example, the change can be read using a phase-locked loop (PLL) or using lock-in wiring.

In various embodiments, the sensor unit has a pump radiation sensor that is configured to capture at least predominantly a radiation power in the spectral range of the pump radiation. In various embodiments, the radiation power is only captured in this spectral range; i.e., conversely, the pump radiation sensor does not capture any radiation power in the spectral range of the conversion light. In various embodiments, this is achieved by applying an appropriate filter to the pump radiation sensor. In general, a photodiode may be provided as a sensor; this may result in a cost-effective and, in view of motor vehicle applications, also robust configuration (a disadvantage may lie in the lack of spatial resolution of the integral measurement, which may be solved using measurement technology; see below).

In various embodiments, a wavelength-dependent filter and/or a polarization filter is applied to the pump radiation sensor. Even though, in general, an integrated filter (wavelength and polarization) or else a plurality of filters are also conceivable, the two filters may be alternatives. By way of example, the pump radiation can have linear polarization; by way of example, it is already originally emitted with linear polarization, like in the case of a laser diode. By way of example, the polarization filter can then be arranged in front of the sensor in such a way that the pump radiation that is incident thereon in the case of no phosphor element being present is transmitted (i.e., also pump radiation that would propagate through a break/tear). The conversion light incident thereon in the case of an intact phosphor element is unpolarized or at least not linearly polarized in an exactly fitting manner, which, on account of scattering processes, also applies to the partly non-converted pump radiation in the case of a partial conversion. By contrast, in the case of a fault, the non-scattered pump radiation with fitting polarization strikes the filter and reaches the pump radiation sensor.

By way of example, the wavelength-dependent filter can be a color filter that only transmits the pump radiation, i.e. which is transmissive in the blue spectral range, for example. A dichroic mirror, too, can be provided as a wavelength-dependent filter, said dichroic mirror being reflective in one wavelength range and being transmissive in another. In general, the pump radiation can also be reflected to the sensor unit; by way of example, the filter is transmissive to the pump radiation and reflective to the conversion light. Typically, a dichroic mirror is constructed from a plurality of dielectric layers that differ in terms of their refractive indices.

When combining a light source constructed from a phosphor element and a pump radiation source with a pump radiation sensor, the situation where the sensor does not capture any radiation power at all during normal operation may also arise in the case of complete conversion. Although illumination light is incident thereon, said light is only formed by the conversion light in that case. In the case of fault, however, pump radiation would propagate along the same path along which the illumination light reaches the sensor unit during normal operation and said pump radiation would be captured by the sensor.

In various embodiments, the sensor unit has a conversion light sensor that is configured to capture at least predominantly a radiation power in the spectral range of the conversion light. In various embodiments, this is achieved by an appropriate application of a filter, e.g. by a wavelength-dependent filter, for instance a color filter or a dichroic mirror. Once again, a photodiode may be provided as a sensor. In general, the capture of the conversion light also can be an alternative; the sensor unit may have a conversion light sensor and a pump radiation sensor.

In general, those configurations in which a signal value is already registered by the sensor (signal value≠0) in the fault-free case are preferred, with said signal value then dropping or further increasing in the case of a fault. It may be disadvantageous in comparison thereto if a signal value equal to zero should be captured in the fault-free case because an outage of the sensor itself could not be determined in that case.

In various embodiments, the lighting apparatus has an evaluation unit that is configured to evaluate a term formed by a sensor signal of the pump radiation sensor and a second sensor signal of the conversion light sensor. By way of example, the term can be a difference; by way of example, it is possible to subtract the second sensor signal (conversion light) from the first sensor signal (pump radiation). The term may be a quotient, the numerator of which may incorporate the first sensor signal (pump radiation) for example, while the second sensor signal is incorporated in the denominator. The evaluation of a term may help improve the signal-to-noise ratio.

In general, the irradiation apparatus may have an evaluation unit. The latter can be provided as a separate component, for instance as a microcontroller; however, an integration is also possible, i.e., for example, a combined evaluation/actuation unit can actuate the array (the tilt position of the actuators) and, at the same time, evaluate the sensor signal or signals captured by the sensor unit. The evaluation unit also can be at least coupled to a control unit of the light source, optionally also integrated therein, in order to prompt a reduction in power or shutdown in the case of a fault, for instance.

In various embodiments, an irradiance reducer is arranged in the off beam, which serves to reduce the irradiance on the sensor unit. In general, a mirror, for example, also can be provided to this end, said mirror reflecting out some of the radiation guided in the off beam, and/or provision can also be made of a filter upstream of the sensor unit, with a dichroic mirror also being possible. A scattering arrangement can be preferred, for example a diffuser that is penetrated by the off beam. The irradiance reducer can be provided, for example, in such a way that, in comparison with a situation without an irradiance reducer, the irradiance produced by the illumination light on the sensor unit (all actuators in the on state) is reduced by e.g. at least 50%, 60%, 70%, 80%, 90%, 95%, 98% or 99%, with possible upper limits (independent thereof) being at e.g. at most 99.99% or 99.9%. An irradiance reducer can be of interest, in particular, if a sensor optical unit is arranged in the off beam, in particular an optical unit that images the actuators on the sensor unit (the sensitive sensor surface thereof).

In general, it may be provided for that component of the illumination light or the radiation guided in the off beam that does not strike the sensor unit to be "destroyed", i.e. to be incident on an absorber.

In various embodiments, a control unit provided for actuating the array is configured in such a way that, should a respective actuator be in the on tilt position ("on state", see below) during a period of operation, said actuator is nevertheless also brought into the off tilt position at a respective time during this period of operation. Thus, even if the actuator should reflect light for the lighting application during the period of operation, the actuator is briefly brought into the off tilt position. In the present case, this is also referred to as folding back and forth, which also can be effectuated periodically with a certain folding frequency. This should be distinguished from the operating frequency, which, as it were, predetermines a refresh rate of the light distribution in the far field. By way of example, the operating frequency determines the timescale at which a respective "pixel" can be activated or deactivated, i.e. the addition or removal of the illumination in a respective partial solid angle range.

By way of example, an operating frequency can lie at at least 5 Hz, at at least 10 Hz, 20 Hz, 30 Hz, 40 Hz or 50 Hz, with increasing preference along the sequence of the specification, with possible upper limits (independent thereof) lying at e.g. at most 300 Hz, 250 Hz, 200 Hz, 150 Hz, 100 Hz, 90 Hz, 80 Hz or 70 Hz (likewise with increasing preference along the sequence of the specification). By way of example, 60 Hz may be provided. In general, the folding back and forth also can be carried out at the same frequency but with a phase offset; however, the folding frequency can also lie higher, for example at least 100 Hz, 200 Hz, 300 Hz, 400 Hz, 500 Hz, 600 Hz, 700 Hz, 800 Hz, 900 Hz or 1000 Hz, with possible upper limits (independent thereof) possibly lying at at most 1 MHz, 100 kHz or 10 kHz, for example. In the case of a periodic operation at a certain operating frequency, the duration of a period of operation emerges as an inverse thereof.

By way of example, a period of operation can be assigned to the on state if the respective actuator is in the on tilt position over the greater part of the period duration, for instance with a percentage of at least 60%, 70% or 80%. Independently thereof, upper limits can lie at at most 99%, 98% or 95%, for example. Conversely, an actuator is in the off state during a period of operation if the off tilt position makes up at least 60%, 70% or 80% of the period duration (with possible upper limits of 99%, 98% or 95%). By way of example, folding back and forth also can be of interest in relation to the service life of the actuators; moreover, it is also possible, for example, to realize grayscale values that may be of interest in the case of the motor vehicle headlamp for transitions in the edge regions of the illumination light cone, for example.

In the present case, brief folding of the respective actuator into the off tilt position can be provided because this provides information about the actuator even in the on state thereof, which would be particularly critical in the case of a fault (by way of example, focused pump radiation could reach the lighting application in the on tilt position). As a rule, a spatial distribution of the emission at an emission surface of the light source also correlates to a spatial distribution on the array (see below for more details); thus, for example, the illumination light emitted at different regions of the emission surface will be guided by different actuators. Therefore, capture by the sensor unit may be of interest not only to the actuators currently in the off state, but also to the actuators in the on state due to possibly only local damage as well. Metaphorically speaking, each actuator does not necessarily "see" local damage of the phosphor element.

In various embodiments, the evaluation unit is configured only to evaluate the actuators in the off state during a period of operation, namely while said actuators are briefly brought into the off tilt position. To this end, the actuators in the off state during this period of operation may be brought into the on tilt position at the instant at which the other actuators are (briefly) brought into the off tilt position. Thus, in the case of the motor vehicle headlamp, an image of the light distribution on the road or in the far field is in fact evaluated. However, by all means, this may be carried out in an integrated manner, i.e. (initially) without a more in-depth spatial resolution on the phosphor element, for example.

Alternatively, an evaluation of the negative is naturally also possible in general; thus, it is also possible (only) to measure the respective actuators in the off state. However, in relation to the procedure just explained above, this may be disadvantageous, for example to the extent that some of the actuators that e.g. supply a central solid angle range can be predominantly in the on state throughout the operation. Hence, they would firstly not be accessible to capture and secondly sometimes also be particularly susceptible to damage and also critical in the case of damage. Combined measurements are also possible such that, for example, the on state can be captured during some periods of operation and the off state can be captured during other periods of operation.

In various embodiments, the light source emits the illumination light at an emission surface with a spatial distribution, i.e. from a certain surface region. The irradiance need not necessarily vary over the surface region; by way of example, it also can be substantially constant and have a so-called flat top profile. The spatial distribution on the emission surface preferably correlates to a spatial distribution on the array; i.e., a respective region of the emission surface is assigned to a respective actuator (and vice versa). In various embodiments, the illumination light is guided onto the array by an optical unit; the emission surface may be imaged onto the array. In various embodiments, the emission surface of a phosphor element forms the emission surface of the light source (see above).

In various embodiments, an evaluation unit of the lighting apparatus is configured to evaluate the actuators in succession, e.g. in groups (but, in general, individually in each case as well), in order to assign a deviation of the emission at the emission surface in a spatially resolved manner. The spatial distributions at the emission surface and at the array correlate, which is why the spatially resolved evaluation of the actuators allows a conclusion to be drawn about the emission surface. Thus, for example, if an excessive pump radiation component is determined for a certain actuator or for a group, it is possible to conclude that damage, for instance a tear/break, through which focused pump radiation propagates, is present in an assigned region of the emission surface.

By way of example, the corresponding actuators can then remain permanently in the off state. In the motor vehicle application, the defect can be highlighted to the vehicle driver in order to urge the latter to seek an automobile repair shop, for instance by way of a control lamp in the vehicle interior or the like. Then, by way of example, only some of the actuators, which are spaced sufficiently far away from the actuators assigned to the damaged region, still can be operated in an emergency light operation. The localization of the damage also can be read, for instance in the automobile repair shop, or else be output automatically to the producer in order, for example, to prompt the provision of fitting replacement parts. In the case of a plurality of defect locations and/or large-area defect locations, dimming of the light source or even a complete deactivation of the light source may also be carried out.

"Evaluating" an actuator or a group of actuators means that the radiation reflected thereby in the off tilt position thereof to the sensor unit is captured, at least in part, and assigned to the actuator or actuators. An evaluation in groups is preferred; that is to say, at least 2 actuators are considered together, wherein further lower limits may lie at at least 5, 10, 50 or 100 actuators per group, with possible upper limits (independent thereof) lying at e.g. no more than $10 \cdot 10^6$, $8 \cdot 10^6$, $6 \cdot 10^6$, $4 \cdot 10^6$, $2 \cdot 10^6$, $1.5 \cdot 10^6$, $1 \cdot 10^6$ or $5 \cdot 10^5$ actuators (in each case with increasing preference along the sequence of the specification). In general, the sequential evaluation can yield a spatial resolution, even in the case of an integrally measuring sensor, for example a simple and hence, however, cost-effective and robust photodiode.

In various embodiments, the actuators are subdivided during the sequential evaluation into a plurality of groups that cover the array in a grid-like manner. By way of example, the grid can be constructed according to rows and columns (with at least 2 actuators in each row and/or each column), for instance in the style of a checkerboard. However, a more complex grid is also possible; by way of example, the groups can be provided to be polygonal per se in each case and in a manner complementing one another in terms of area, and can also form a honeycomb grid, for example. In various embodiments, the groups are defined in advance; that is to say, the grid is set in advance and it is therefore not modified depending on the groups evaluated to date. Then, a measurement is carried out until, for example, the field with the deviation is found.

In various embodiments in which the actuators are successively measured in groups, the number of actuators evaluated in each iteration is successively reduced and hence the deviation is localized. In general, this is also possible in combination with a predefined, grid-like subdivision; however, a dynamic adaptation of the groups is preferred in this case, that is to say that the actuators to be evaluated subsequently are determined according to the actuators evaluated to date. The number of actuators is successively reduced, not necessarily from each iteration to the next, but over a plurality of iterations.

In general, a profile image of the irradiance distribution may be stored in the evaluation unit. Thus, the radiation power to be expected when evaluating a certain actuator or a group is also known. To this end, it is then also possible to define e.g. threshold values, the undershoot or overshoot thereof diagnosing a deviation. Such a profile image can be ascertained virtually, for example by way of a ray tracing simulation; on the other hand, it can however also be measured and a combination of measurement and simulation is possible too. The measurement can be undertaken at a lighting apparatus with an identical structure and it can be transferred; however, it is also possible for each lighting apparatus per se to be calibrated during the production by way of an appropriate measurement. Particularly if a profile image of the irradiance distribution is stored, the successive reduction in the number of actuators per group, i.e., metaphorically speaking, the encircling of the defect site, can also be carried out, for example, on the basis of groups that are divided stochastically and/or groups that are evaluated in a stochastic sequence.

In various embodiments, the array for localizing the deviation is subdivided into two halves, the deviation is assigned to one of the halves and this remaining half is subdivided into two halves anew; that is to say, the array overall is quartered in that case. The deviation is then assigned anew, wherein the subdivision into halves (then ⅛, 1/16, 1/32, etc.) can be continued until the deviation is localized with sufficient accuracy. By way of example, should it then be determined that the deviation is not situated at the edge but instead situated adjoining another half that was previously excluded within the course of the iteration, this other half can then be separately resolved again in the same way by iterations. For the purposes of the assignment to a half, the active array surface, i.e. the surface occupied by the actuators, is in fact taken and divided into two parts with substantially the same sized area; by way of example, the areas have the same size (however, the larger area could, in general, also deviate from the smaller area by no more than 15%, 10% or 5%, for example). The halves may adjoin one another along a straight separation plane; that is to say, they can be formed by the diagonal or one of the central axes of mirror symmetry of the rectangle in the case of a rectangular active array surface, for example.

Various embodiments also relates to a method for operating a lighting apparatus as disclosed presently, said lighting apparatus having an evaluation unit that is used to evaluate the micromirror actuators. To the extent that the preceding description or the claims refer to an evaluation unit that is configured for a certain operation, this should expressly also be read as a disclosure of the corresponding operating method.

Various embodiments also relates to a use of the lighting apparatus for lighting purposes. Even though, in general, applications in the area of projections (video, cinema), in effect and entertainment lighting or else in the architainment field are also conceivable, a configuration of various embodiments relates to the use of a lighting apparatus as disclosed presently for vehicle lighting, preferably in a front headlamp. In general, a use in a ship or an airplane or helicopter, as well, is conceivable; a motor vehicle, e.g. an automobile, may be provided. The street illumination may be adaptive; that is to say, other road users are selectively excluded from the illumination for the purposes of avoiding dazzle.

A solid angle volume that the illumination light cone can maximally fill is segmented, e.g. subdivided in rows and columns, and only those segments in which the other road user, for example another automobile, or else a pedestrian or cyclist, was determined are switched away or reduced in terms of their intensity (it is also possible to realize grayscale values using the "flaps"; see above). Here, the actuators can also be combined in groups, for example with at least 10, 50, 100 actuators per group and (independently thereof) e.g. no more than 1000 or 500 actuators. By way of example, it is also possible to realize a cornering light or objects also can be illuminated in a targeted manner (e.g. a wild animal at the road edge, or else persons), for instance for marking purposes (hazard identification).

In various embodiments, the array is operated depending on a vehicle sensor measurement, e.g. on one or more camera images.

The camera images can be subdivided in a manner corresponding to the segmentation of the maximum accessible illumination light cone, with one or more actuators of the array being assigned to each segment in that case. If another road user is determined in a segment, the corresponding actuators are brought into the off state.

Figure 1:
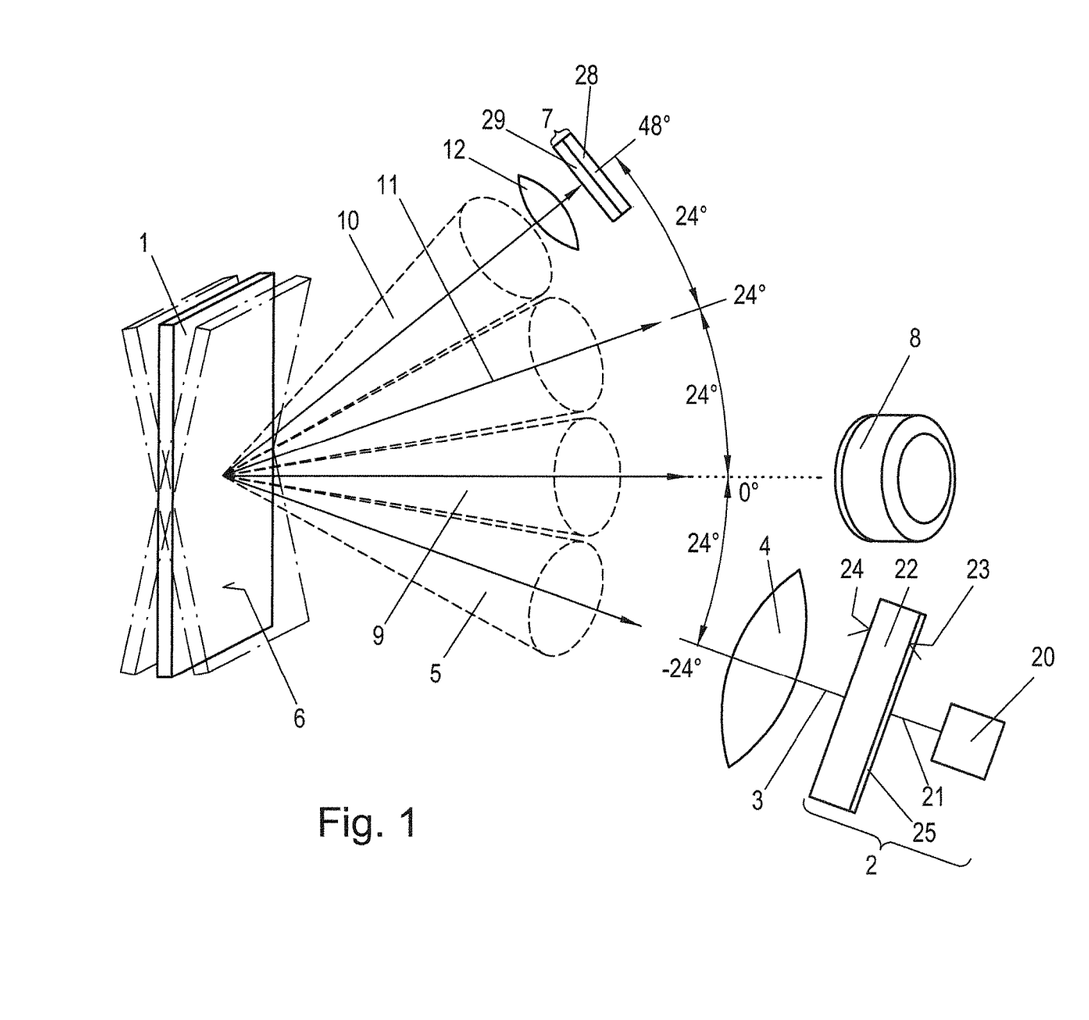
FIG. 1 shows a lighting apparatus according to various embodiments, having a light source, an actuator of a micromirror array and a sensor unit.

FIG. 1 shows a lighting apparatus according to various embodiments with a micromirror actuator 1, which is part of an array of actuators (not illustrated in the entirety thereof) and which is supplied with illumination light 3 by a light source 2. The illumination light 3 passes through a converging lens as a supply optical unit 4 and, in the form of a supply beam 5, strikes the micromirror array. For reasons of presentation, only the one micromirror actuator 1 of the array is shown; nevertheless, the supplied/reflected light is elucidated on the basis of the beams, i.e. in relation to the entire array.

The micromirror actuator 1 is depicted in the non-deflected state. It can be tilted back and forth between two maximum tilt positions, which are indicated using dash-dotted lines. The non-deflected state is referred to as transient flat state and, in the present case, one maximum tilt position corresponds to the on tilt position and the other corresponds to the off tilt position. According to various embodiments, the micromirror actuator 1 in the off tilt position reflects the illumination light striking its mirror surface 6 onto a sensor unit 7. By contrast, in the on tilt position, the illumination light is guided through an illumination optical unit 8 (a lens system) and consequently used in the present case for the purposes of producing a light distribution in the far field, specifically for adaptive road illumination in a motor vehicle front headlamp.

FIG. 1 illustrates further how, caused by the tiltability of the micromirror actuators 1 by +/−12° in the present case, an overall accessible overall angle range of 96° can be subdivided. In addition to the supply beam 5, the on beam 9 (to the illumination optical unit 8), the off beam 10 (on the sensor unit 7) and the transient beam 11 are illustrated in this overall angle range. The on beam 9 and the off beam 10 are spaced apart from one another by way of the transient beam 11 in order to keep unintended reflections out of the on beam 9 to the greatest possible extent for the purposes of a good contrast. Said unintended reflections may occur more frequently in the transient flat state because the mirror surfaces of the actuators in this case lie parallel to the chip plane and so reflections from the remaining chip surface (connecting webs, metallization, etc.) also can be introduced.

In the lighting apparatus according to various embodiments, the illumination light guided in the off beam 10 is not destroyed in an absorber (beam dump), which otherwise could be possibly advantageous in respect of a contrast optimization. Instead, the radiation is guided to the sensor unit 7 via a converging lens as a sensor optical unit 12 and used for monitoring the state of the light source 2. This may be provided to the extent that, firstly, monitoring of the light source 2 is precisely made possible but that, secondly, this does not mean a loss of efficiency because the radiation guided in the off beam 10 is not, in principle, used for illumination purposes in any case.

The light source 2 is constructed from a pump radiation source 20 and a phosphor element 22. A laser diode is provided as pump radiation source 20 (a plurality of laser diodes are also possible). The pump radiation 21 emitted thereby is blue laser light in the present case. As a rule, this strikes, in a collimated manner, a phosphor element 22, specifically the incoming radiation surface 23 thereof, arranged at a distance therefrom.

Following the excitation with the pump radiation 21, the phosphor element 22 emits a conversion light, portions of which form the illumination light 3 and are led away at the emission surface 24. The emission surface 24 is imaged on the array by the supply optical unit 4. In the present case, the phosphor element has YAG:Ce as a phosphor; the conversion light is yellow light. Only a portion of the pump radiation 21 is converted (partial conversion); a remaining part of the blue laser light forms white light as illumination light 3 after mixing with the yellow conversion light.

The phosphor element 22 is operated in transmission; the emission surface 24 lies opposite the incoming radiation surface 23. A dichroic coating 25, which transmits the pump radiation 21 but reflects the conversion light, is provided on the incoming radiation surface 23 for the purposes of increasing the efficiency. The phosphor element 22 is arranged on a carrier, for example made of sapphire, although the latter is not illustrated. Even if portions of non-converted pump radiation 21 reach the lighting application in the present case, this is noncritical because the pump radiation 21 is fanned when passing through the phosphor element 22, for instance on account of scattering processes; that is to say, it does not reach the lighting application in a focused manner.

However, various faults in which there may be a critical emergence of pump radiation 21 on the application side are conceivable. By way of example, the phosphor element 22 may detach from a carrier (not illustrated) in its entirety; however, the collimated pump radiation can already propagate through a tear/break of the phosphor element 22 as well. The present lighting apparatus is configured to detect such a fault in order then to prompt a deactivation of the pump radiation source 20 or an at least partial switching away of the illumination by way of the array in the case of a fault.

The sensor unit 7 has a pump radiation sensor 28 that is provided with a wavelength-dependent filter 29. Only radiation in the wavelength range of the pump radiation 21 reaches the pump radiation sensor 28 through said filter, and not the conversion light. The pump radiation sensor 28, a photodiode in the present case, is therefore configured by way of the application of the filter to capture in the spectral range of the pump radiation. With an analog construction, a conversion light sensor could also be provided (not illustrated) as an alternative to, or else in combination with, the pump radiation sensor 28.

By way of example, if more pump radiation propagates in the supply beam 5 to the array, and hence also in the off beam, in the case of one of the faults, the pump radiation sensor 28 captures an increased radiation power. By way of example, it is possible to prompt a deactivation of the pump radiation source.

Figure 2:
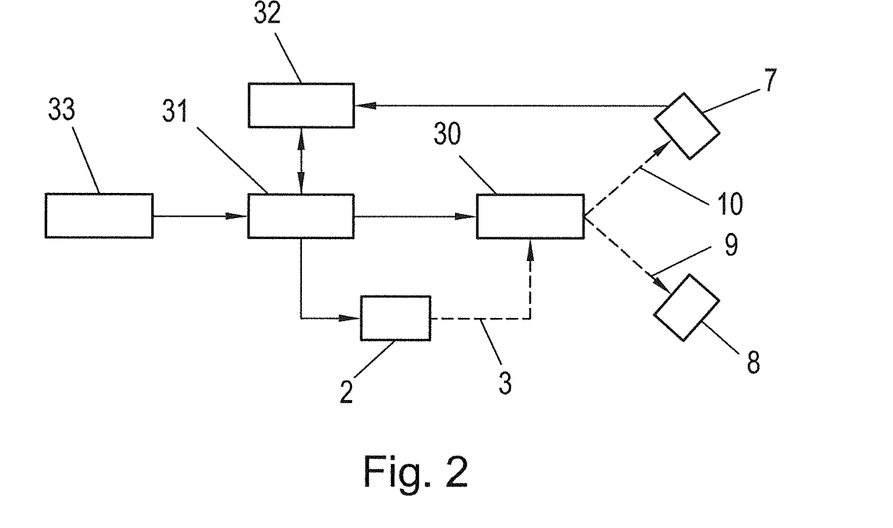
FIG. 2 shows a system block diagram for actuating and evaluating the lighting apparatus according to FIG. 1.

FIG. 2 shows a system block diagram, wherein some of the optical components described up until now are also reproduced schematically, namely the light source 2, the illumination optical unit 8, the sensor unit 7 and the micromirror array 30. Further, the light propagation is partly shown in a schematic manner (in a dashed manner in each case). Additionally, it is possible to identify a control unit 31 which actuates both the micromirror array 30 and the light source 2 in a combined fashion in the present case (a separated actuation would likewise be possible as well). The control unit 31 predetermines the respective tilt position for the actuators of the micromirror array 30; that is to say, it determines how much illumination light reaches the lighting application in which solid angle regions.

Further, it is possible to identify an evaluation unit 32, which firstly receives a measurement signal from the sensor unit 7 and secondly interacts with the control unit 31. Information items in respect of the tilt positions of the respective actuators can be passed from the control unit 31 to the evaluation unit 32; conversely, the evaluation unit can prompt a deactivation of the light source 2 or of the micromirror array 30 by way of the control unit 31 in the case of a fault detection. For reasons of clarity, the control unit 31 and the evaluation unit 32 are illustrated separately; however, they may also have an integrated embodiment in practice.

Further, the control unit 31 receives data from a vehicle sensor 33, a camera system with image processing in the present case. The latter identifies other road users and can assign certain solid angle regions to the latter; these solid angle regions are then excluded from the illumination via the control unit 31 by way of appropriate switching of the micromirror array 30. The illumination optical unit 8 converts a spatial distribution of the micromirror array 30 into a solid angle distribution; metaphorically speaking, individual solid angle regions therefrom can then be added or subtracted like pixels.

The operation is carried out in a clocked manner, with an operating frequency of 60 Hz in the present case. Thus, this is a frequency at which the supply of a respective solid angle range can be modified. Further, the actuators of the micromirror array 30 are folded back and forth at a higher frequency, which may lie in the kHz range, for example. Even if a respective actuator is in the off state, it therefore briefly assumes the on tilt position multiple times during the corresponding period of operation, and vice versa. This may be provided from the measurement technology point of view; see the introductory part of the description in detail.

As mentioned previously, for the capturing provision is preferably made of a photodiode; this is robust and cost effective but, on the other hand, does not yield any spatial resolution. However, a spatially resolved evaluation may be of interest in order to localize a damaged area of the phosphor element 22; this is because the spatial distribution of the irradiance on the micromirror array 30 correlates with the spatial distribution of the irradiance on the emission surface 24 of the phosphor element 22, e.g. on account of the imaging properties of the sensor optical unit 12. Reference is expressly made to the introductory part of the description; on account of the reference thereto, the two evaluation options illustrated below on the basis of FIG. 3 and FIG. 4 are also presented in abbreviated form.

Figure 3:
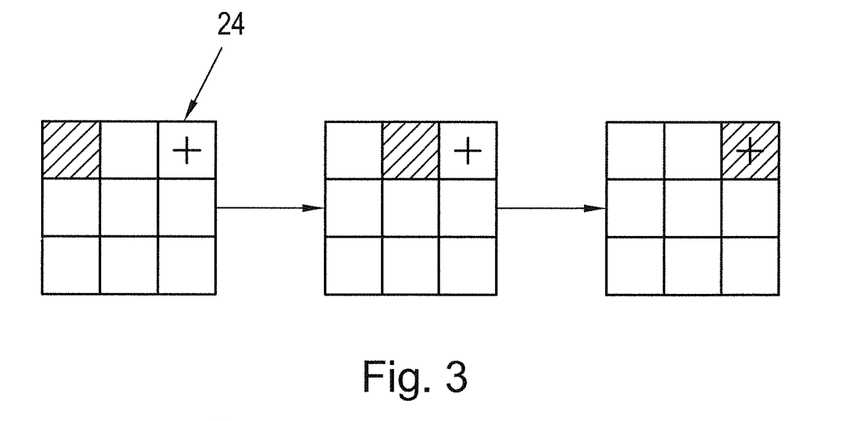
FIG. 3 shows a first option for sequential evaluation of the actuators of the micromirror array.
Figure 4:
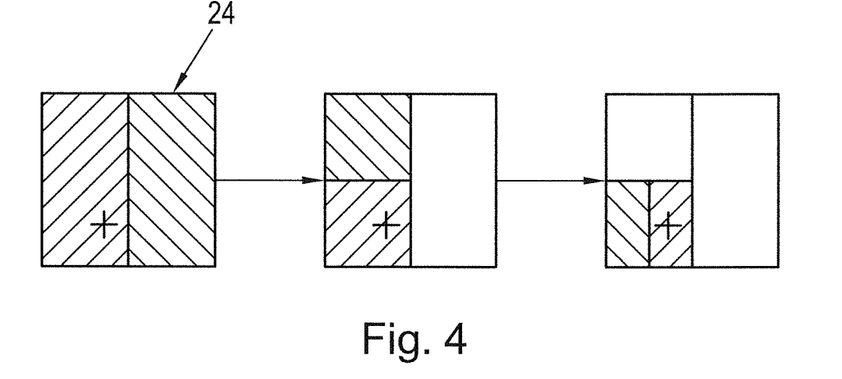
FIG. 4 shows a second option for sequential evaluation of the actuators of the micromirror array.

FIG. 3 and FIG. 4 illustrate the emission surface 24 in a plan view; the cross in each case marks an area of damage. By way of the group-by-group evaluation of the actuators of the micromirror array 30, the emission surface 24 is de facto segmented as illustrated and the area of damage is localized in a plurality of successive measurements.

In the case of FIG. 3, a predefined grid is placed over the emission surface 24. The individual regions, i.e. the respectively assigned actuators, are measured in succession, in each case indicated by hatching (this specifies the region measured in each case). In the present case, the area of damage is found during the third measurement; in another arrangement, fewer/more measurements would have to be undertaken accordingly.

In FIG. 4, the emission surface 24 is subdivided into two halves that are measured in succession (hatched in each case in different directions). In a next step, the half in which the deviation was determined (an increased radiation power) is then subdivided anew into two halves, and the radiation power measured in these two halves is compared. This is continued until the area of damage is localized with sufficient accuracy.

| List of Reference Signs | |
|---|---|
| Micromirror actuator | 1 |
| Light source | 2 |
| Illumination light | 3 |
| Supply optical unit | 4 |
| Beam | 5 |
| Sensor unit | 7 |
| Illumination optical unit | 8 |
| On beam | 9 |
| Off beam | 10 |
| Sensor optical unit | 12 |
| Pump radiation source | 20 |
| Pump radiation | 21 |
| Phosphor element | 22 |
| Incoming radiation surface | 23 |
| Emission surface | 24 |
| Pump radiation sensor | 28 |
| Wave-dependent filter | 29 |
| Micromirror array | 30 |
| Control unit | 31 |
| Evaluation unit | 32 |
| Vehicle sensor | 33 |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting apparatus, comprising:
a light source for emitting an illumination light;
a micromirror array having a plurality of micromirror actuators;
an illumination optical unit and an optical sensor unit;
wherein the illumination light emitted by the light source is guided onto the micromirror actuators and reflected at the latter and, with the reflection integrated over time;
an on beam is reflected to a lighting application by the micromirror actuators in a respective on tilt position via the illumination optical unit; and
an off beam is reflected next to the illumination optical unit by the micromirror actuators in a respective off tilt position;
wherein part of the illumination light contained in the off beam is guided, at least in part, onto the optical sensor unit;
wherein an evaluation unit of the lighting apparatus is configured to assign a deviation in an emission of the light source at an emission surface in a spatially resolved manner by a sequential evaluation, at least in groups, of the micromirror actuators; and
wherein the evaluation unit is configured, during the sequential evaluation, to subdivide the micromirror actuators into a plurality of groups in order to measure the groups successively over a plurality of iterations and, in the process, in order to measure the micromirror actuators of the respective group together in each iteration, wherein, over a number of the iterations, the number of micromirror actuators that are evaluated in each iteration is reduced step-by-step and hence the deviation is localized.

2. The lighting apparatus of claim 1,
wherein the light source has a pump radiation source for emitting pump radiation and a phosphor element for at least partial conversion of the pump radiation into conversion light, said conversion light, at least in part, forming the illumination light.

3. The lighting apparatus of claim 2,
wherein the phosphor element is operated in transmission.

4. The lighting apparatus of claim 2,
wherein a pump radiation sensor of the sensor unit is configured to capture at least predominantly a radiation power in the spectral range of the pump radiation.

5. The lighting apparatus of claim 4,
wherein the pump radiation sensor of the sensor unit is configured to capture at least predominantly a radiation power in the spectral range of the pump radiation by applying a filter to the pump radiation sensor.

6. The lighting apparatus of claim 5,
wherein the filter is configured as at least one of a wavelength-dependent filter or a polarization filter.

7. The lighting apparatus of claim 2,
wherein a conversion light sensor of the sensor unit is configured to capture at least predominantly a radiation power in the spectral range of the conversion light.

8. The lighting apparatus of claim 7,
wherein a conversion light sensor of the sensor unit is configured to capture at least predominantly a radiation power in the spectral range of the conversion light by applying a filter to the conversion light sensor.

9. The lighting apparatus of claim 4, further comprising:
an evaluation unit that is configured to evaluate a term formed by a first sensor signal of the pump radiation sensor and a second sensor signal of the conversion light sensor.

10. The lighting apparatus of claim 1,
wherein an irradiance reducer is arranged in the off beam.

11. The lighting apparatus of claim 1, further comprising:
a control unit for actuating the micromirror array, the control unit being configured in such a way that, should a respective micromirror actuator be in the on tilt position during a period of operation, said micromirror actuator is nevertheless also brought into the off tilt position at a respective time during this period of operation.

12. The lighting apparatus of claim 1, further comprising:
an evaluation unit that is configured, in the period of operation, to evaluate only the micromirror actuators in the on tilt position during the period of operation, namely when said micromirror actuators are brought into the off tilt position at a respective time.

13. The lighting apparatus of claim 1,
wherein the light source is configured to emit the illumination light at an emission surface with a spatial distribution that correlates to a spatial distribution on the micromirror array.

14. The lighting apparatus of claim 13,
wherein the evaluation unit is configured, during the sequential evaluation, to subdivide the micromirror actuators into a plurality of predefined groups that cover the micromirror array in a grid-like fashion in order to measure the groups successively over a plurality of iterations and in order, in the process, to measure the micromirror actuators of the respective group together in each iteration.

15. The lighting apparatus of claim 13,
wherein the evaluation unit is configured, during the sequential evaluation, to initially evaluate the micromirror actuators arranged in one half of the micromirror array and then evaluate the micromirror actuators arranged in the other half thereof, in each case together, in order subsequently, for a remaining one of the two halves to which the deviation should be assigned, to once again successively initially evaluate the mirror actuators arranged in one half of the remaining half and then evaluate the micromirror actuators arranged in the other half thereof, in each case together, and to assign the deviation.

16. A motor vehicle headlamp for adaptive street illumination, comprising:
a lighting apparatus, comprising:
a light source for emitting an illumination light;
a micromirror array having a plurality of micromirror actuators;
an illumination optical unit and an optical sensor unit;
wherein the illumination light emitted by the light source is guided onto the micromirror actuators and reflected at the latter and, with the reflection integrated over time;
an on beam is reflected to a lighting application by the micromirror actuators in a respective on tilt position via the illumination optical unit; and
an off beam is reflected next to the illumination optical unit by the micromirror actuators in a respective off tilt position;
wherein part of the illumination light contained in the off beam is guided, at least in part, onto the optical sensor unit;
wherein an evaluation unit of the lighting apparatus is configured to assign a deviation in an emission of the light source at an emission surface in a spatially resolved manner by a sequential evaluation, at least in groups, of the micromirror actuators; and
wherein the evaluation unit is configured, during the sequential evaluation, to subdivide the micromirror actuators into a plurality of groups in order to measure the groups successively over a plurality of iterations and, in the process, in order to measure the micromirror actuators of the respective group together in each iteration, wherein, over a number of the iterations, the number of micromirror actuators that are evaluated in each iteration is reduced step-by-step and hence the deviation is localized.

17. The motor vehicle headlamp of claim 16,
wherein the micromirror actuators of the micromirror array are configured to be selectively brought into the on or the off tilt position depending on a measurement with a vehicle sensor.

18. The motor vehicle headlamp of claim 17,
wherein the vehicle sensor is a camera image.

* * * * *